Figure 1:
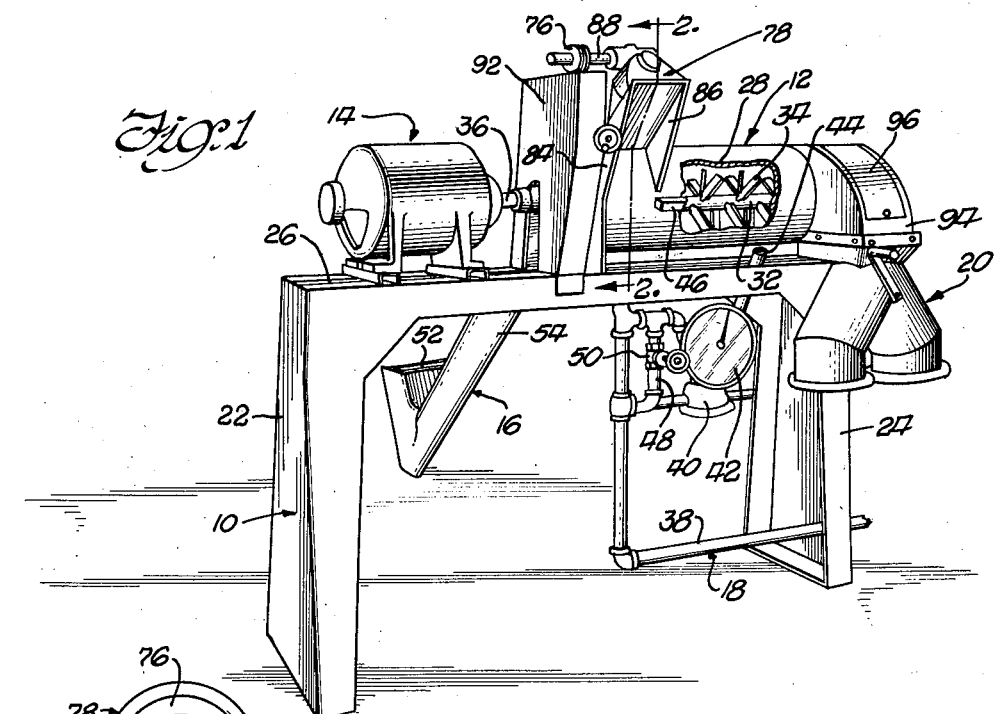

Sept. 17, 1957   H. W. STEVENS ET AL   2,806,678
BLENDER
Filed Dec. 8, 1954

Inventors
Harold W. Stevens
Clarence Robert Myers
John B. Myers
by Moore, Prangley & Clayton Attorneys

United States Patent Office 2,806,678
Patented Sept. 17, 1957

2,806,678

BLENDER

Harold W. Stevens, Clarence R. Myers, and John B. Myers, Streator, Ill., assignors to The Myers Sherman Company, Streator, Ill., a corporation of Illinois Application December 8, 1954, Serial No. 473,833

1 Claim. (Cl. 259—10)

This invention relates to blenders and particularly to apparatus for mixing and blending viscous materials with dry light bulky materials.

The apparatus of the present invention has for its purpose the blending of viscous liquids such as molasses and the like with various dry feed materials such as ground grain and ground light bulky materials such as ground hay. In general the blending apparatus used heretofore has been unsatisfactory in blending molasses and similar viscous liquids with dry light bulky materials such as ground hay because the ground hay bridges and chokes the passages leading to the blending chamber. The product when mixing molasses with ground hay also often is balled or lumped thus preventing uniform distribution of the molasses throughout the feed product.

Accordingly, it is an object of the present invention to provide an improved blender of the type set forth which is useful in blending viscous liquids with all types of ground feed materials.

More particularly, it is an object of the present invention to provide a blender which will mix viscous fluids such as molasses with dry light bulky materials such as ground hay without balling or lumping.

Still another object of the invention is to provide a feed mechanism for blenders of the type set forth which will feed light dry bulky material such as ground hay to the blending chamber at a higher rate and in a forced and positive controlled manner that prevents bridging and choking of the material being fed.

A further object of the invention is to provide an improved blender of the type set forth in which the product has the viscous fluid more evenly distributed throughout and in which a high amount of the viscous fluid can be incorporated in the product.

Figure 2:
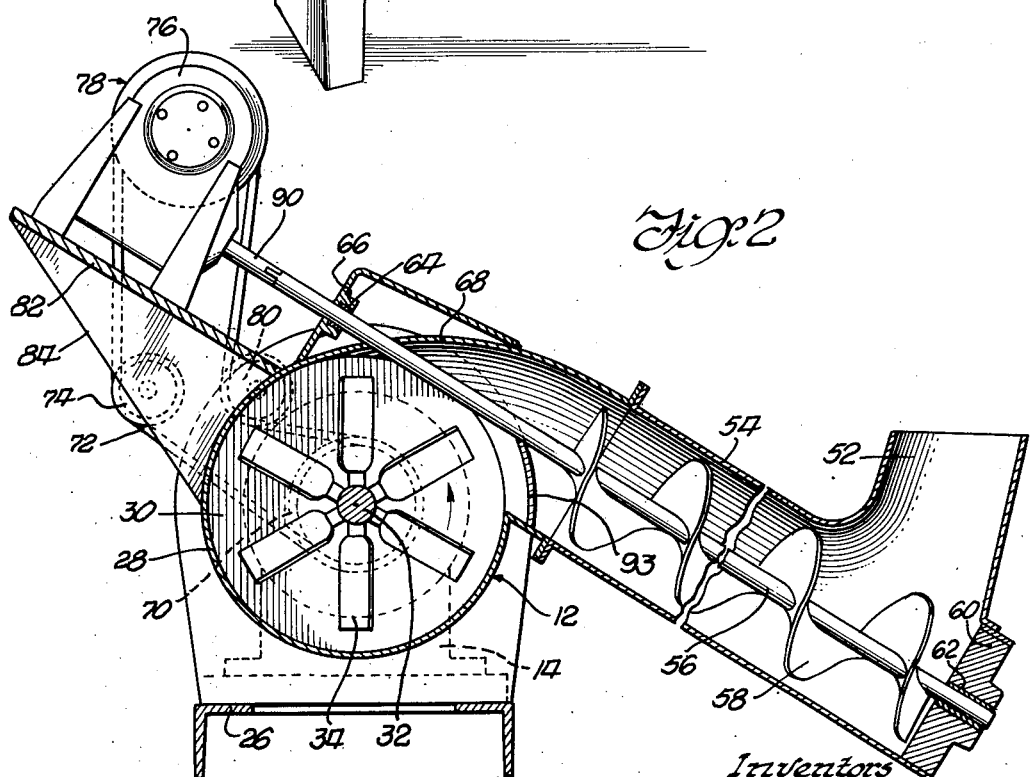

These and other objects and advantages of the invention will be better understood from the following description when taken in conjunction with the accompanying drawing. In the drawing wherein like reference numerals have been utilized to designate like parts throughout:

Figure 1 is a perspective view with certain parts broken away of an improved blender incorporating the principles and advantages of the present invention; and Figure 2 is an enlarged partial view in vertical section substantially as seen in the direction of the arrows along the line 2—2 of Figure 1.

Referring to Figure 1, it will be seen that the blender includes generally a base 10 upon which is mounted a blending chamber 12, a drive motor 14, a dry material feeding mechanism 16, a molasses supply input 18 and a bagger 20.

Frame 10 includes a pair of spaced apart support ends 22 and 24 which have disposed therebetween a substantially horizontally positioned member 26. Firmly secured to member 26 is the blending chamber 12 which includes a substantially cylindrical housing 28 closed at the left hand end as seen in Figure 1 by a wall 30. Passing through wall 30 and journaled therein is a shaft 32 which carries a plurality of blending arms or paddles 34 extending radially therefrom. As may be best seen in Figure 1, the blending arms 34 are staggered along the axis of shaft 32 throughout the entire length thereof and are inclined whereby to move material from the left to the right as viewed in Figure 1 upon rotation of shaft 32.

Motive power to drive shaft 32 and the attached blending arms 34 is derived from motor 14 which is illustrated as an electric motor. It is to be understood that other types of primes movers such as a gasoline engine or similar source of power may be utilized. The output shaft 36 of the gear reducer on motor 14 is connected directly to shaft 32 whereby to drive shaft 32 and cause blending and mixing of materials in blending chamber 12.

The molasses input 18 includes a pipe 38 connected to a source of molasses or similar viscous material (not shown), the source being equipped with a pump so that the molasses is supplied to pipe 38 under pressure. Pipe 38 connects with a meter 40 having an indicating dial 42 and molasses which passes through meter 40 enters a pipe 44. Pipe 44 is connected to an input manifold 46 by a section of pipe which has been cut away to illustrate the construction of the interior of blending chamber 12 in Figure 1. Meter 40 is provided with a by-pass line 48 and a valve 50 therein.

As may be best seen in Figure 1, the molasses in manifold 46 feeds molasses to the left hand end of blending chamber 12. The dry feed material is also preferably fed in the left hand end of blending chamber 12, the feeding being in a positive forced manner and in a positive controlled manner. To this end a feed hopper 52 is provided which is adapted to receive ground dry material such as ground grain or ground hay. The lower end of feed hopper 52 communicates with a feed auger positioned within a substantially cylindrical feed pipe 54 within which is positioned a shaft 56 in which is mounted the helical feed auger 58. Pipe 54 is closed at one end by a plate 60 which carries therein a bearing 62 at the lower end of shaft 56. The other end of shaft 56 is supported by a bearing 64 mounted on a wall 66 at the upper end of pipe 54. A curved wall 68 is provided near the upper end of pipe 54 to form a smooth surface for directing the dry ground material into the blending chamber 12. Shaft 56 passes through wall 68 and the juncture thereby formed is sealed in any suitable manner.

When auger 58 is rotated, material in hopper 52 is forced fed upwardly through the length of pipe 54 and into the blending chamber 12. Power for turning shaft 56 is derived from the electric motor 14. More specifically, a pulley 70 (see Figure 2) is mounted on motor shaft 36 and drives a belt 72. Belt 72 passes around a first guide pulley 74, a pulley 76 connected to a gear reducer box generally designated by the numeral 78, and another guide pulley 80.

Gear box 78 is mounted upon a plate 82 welded to housing 28 and supported and reinforced by a pair of flanges 84 and 86. The input to gear reducer 78 is through shaft 88 on which is mounted the pulley 76. The output of the gear reducer 78 is a shaft 90 which engages the upper end of shaft 56. Operation of motor 14 accordingly drives belt 72 and gear reducer 78 whereby to drive shaft 56.

The pulleys 74 and 80 and associated parts are enclosed within a protective housing 92 so that the various moving parts are not exposed to endanger the hands of a user. Preferably the shaft 56 is inclined at an angle of about 35° with respect to the horizontal and is displaced from the center of blending chamber 12 whereby the ground material fed by auger 58 enters the blending chamber 12 in a tangential manner. A tangential entry of the dry material from feed pipe 54 is insured by providing a curved wall 93 which directs the dry material upwardly toward the top of blending chamber 30.

The right hand or outlet side of blending chamber 12 connects with a transverse enclosed passage 94 which leads into the top of the bagger 20. Preferably a door 96 is provided to permit access to the outlet end of the blending chamber 12 and the entrance to the bagger 20.

The operation of the blender is as follows. Connection is made through pipe 38 to a source of molasses under pressure and ground dry feed is placed in hopper 52. Motor 14 is then started whereby to begin operation of auger 58 and mixing arms 34. The rate of feed of the molasses is adjusted (by a valve not shown) to the desired amount and a bag is placed under the operable outlet of bagger 20. The dry ground material is forced fed at a high rate by auger 58 upwardly and a large steady stream of the dry material enters blending chamber 12 tangentially and under positive forced feed. The blending arms 34 in chamber 12 convey the material along chamber 12 and past the molasses input manifold 46. The molasses from manifold 46 is mixed with the dry feed throughly by the action of blending arms 34 as the feed and molasses pass down the length of chamber 12. By the time the molasses and feed reach the outlet end of chamber 12, they are thoroughly mixed and are dropped into the bag attached to bagger 20.

The described blender is operable to mix light bulky materials such as ground hay with molasses without balling or lumping and at a very high rate. This assures uniform and complete distribution of the molasses throughout the ground feed. This results in a large part from the positive controlled and forced feed of the dry material by auger 58 and mixing arms 34. There is no tendency for the dry material to bridge or choke the input to the blending chamber 12 or the blending chamber 12.

Although a preferred embodiment of the invention has been shown for purposes of illustration, it is to be understood that various changes and modifications can be made therein without departing from the spirit and scope thereof. Accordingly, the invention is to be limited only as set forth in the following claim.

We claim:

An apparatus for blending viscous fluids with light bulky ground feeds comprising a base, an elongated cylindrical blending chamber mounted upon said base and having the axis thereof disposed substantially horizontally, a feed pipe for light bulky ground feeds connecting tangentially with one end of said blending chamber and having the axis thereof disposed substantially perpendicular to the axis of said blending chamber and at at an angle of approximately 35 degrees with the horizontal, a feed hopper connecting with said feed pipe at one end thereof, said one end of said feed pipe being positioned below the connection between said feed pipe and said cylindrical blending chamber, a screw conveyer positioned in said feed pipe to force feed ground feed into said one end of said blending chamber in a positive and controlled manner, the top wall of said feed pipe at the point of connection with said blending chamber being curved to form substantially a continuation of said cylindrical blending chamber, a curved wall mounted in said feed pipe in the bottom portion thereof adjacent the point of connection with said blending chamber, said curved wall extending upwardly to substantially the center of said feed pipe and being curved toward said blending chamber to guide ground feed into said blending chamber tangentially, means adjacent said one end of said blending chamber for feeding viscous fluid at a controlled rate into said blending chamber, a shaft positioned in said blending chamber and extending substantially the length thereof, a plurality of blending arms mounted on said shaft for rotation therewith to blend material within said blending chamber and forcibly to move said material from said one end of said blending chamber to the other end, a blended material outlet at said other end of said blending chamber, and a prime mover mounted on said base and connected to said screw conveyer and said shaft to drive said screw conveyer and said shaft.

References Cited in the file of this patent

UNITED STATES PATENTS

| | | |
|---|---|---|
| 1,760,906 | Johnson | June 3, 1930 |
| 2,281,974 | Herr | May 5, 1942 |
| 2,509,431 | Hall et al. | May 30, 1950 |